United States Patent Office 3,258,446
Patented June 28, 1966

3,258,446
MOLDING COMPOSITION FROM AN UN-
SATURATED POLYESTER CONTAINING
ANTHRACENE
Günther Nischk, Leverkusen, and Karlheinz Andres,
Cologne-Flittard, Germany, assignors to Farbenfabriken Bayer Aktiengesellschaft, Leverkusen, Germany, a German corporation
No Drawing. Filed Aug. 22, 1961, Ser. No. 133,037
Claims priority, application Germany, Sept. 3, 1960,
F 32,043
5 Claims. (Cl. 260—40)

The present invention relates to synthetic resin-bonded compositions having an unsaturated polyester resins base which is free of vinyl monomer.

It is known to impregnate inorganic or organic fibrous materials in the form of rovings, fabrics or mats with hardenable synthetic resins as bonding agents. Such bonding agents are condensation products, such as phenol-formaldehyde and cresol-formaldehyde resins as well as epoxy resins or unsaturated polyester resins. The unsaturated polyesters, usually used in the form of a styrene solution, are unsuitable for the production of impregnated fiber structures, firstly on account of the high volatility of the styrene and secondly on account of insufficient storage stability, since the organic peroxide necessary for the hardening and concurrently used in the impregnation causes the gelling of the resin after a few weeks and thus no longer permits of pressing into suitable shapes.

It has already been attempted to replace styrene by diallyl phthalate as a copolymerizable component in combination with unsaturated polyesters and to process the mixture as a bonding agent for the purpose described. A disadvantage which arises in this case is a tackiness of the impregnated fiber structures, which does not permit of clean handling.

In order to obviate this disadvantage, crystallized, unsaturated polyesters which are free from monomers have been used as bonding agents. Such polyesters are obtained for example by reacting unsaturated α,β-trans-dicarboxylic acids, such as fumaric acid, with diols comprising terminal OH groups, such as for example butylene-1,4-glycol.

Polyesters of this type in their turn show various other disadvantages. In the first place, they have high melting points, for example in the region of 120° C., so that to impregnate the fiber materials in the molten state and in the simultaneous presence of the necessary organic peroxides is not possible, since gelling and hardening of the polyester occurs at high temperatures. Moreover, the solubility of such products in inert organic solvents which are concurrently used for the impregnation is poor, so that also in this way an impregnation of fibrous materials is incomplete. In addition, the mechanical strength properties are inadequate and cannot for example be compared with those of copolymers of common unsaturated polyesters and styrene.

It has now been found that the above disadvantages can be avoided by using for the manufacture of fiber bonded materials special compositions having a vinyl monomer-free unsaturated polyester base which harden under pressure and heat in the presence of catalysts. These compositions are characterized by these components: (I) a polymerizable linear polyester resin, said polyester resin being the reaction product of (a) fumaric acid, (b) a dihydric saturated aliphatic alcohol containing an even number of —$CH_2$— groups, and (c) anthracene, (II) a fibrous reinforcing material, and (III) an organic peroxide polymerization catalyst.

It is true that it is essentially fumaric acid which is to be considered as the unsaturated α,β-trans-dicarboxylic acid within the scope of the present invention, but this does not exclude the use of other unsaturated trans-dicarboxylic acids.

Suitable alcohol components for the polyesters to be used according to the present invention are dihydric alcohols having an even number of —$CH_2$— units, such as ethylene glycol, butylene-1,4-glycol, hexane-1,6-diol, 2,2'-dimethyl propane-1,3-diol, which if necessary can also carry branches, and similar compounds.

The esterification of the components can be carried out under conditions known per se, with or without the use of conventional esterification catalysts in an inert gas atmosphere, and with or without the use of solvents. Advantageously, equimolar quantities and if necessary a moderate excess of the diol, i.e. about 20 percent by weight, are used. The esterification temperature can be between 150 and 200° C. and is advantageously in the region of 180° C. The polyesters obtained are always of crystalline nature and have melting points within a range of about 80 to 100° C.

According to the present invention, polyesters are to be used which are formed by addition of anthracene or its derivatives to unsaturated double bonds of the polyester components. For the production of these modified polyesters, the procedure can be that suitable Diels-Alder adducts of fumaric acid are concurrently used with anthracene or its derivatives in the polycondensation. It is obvious that adducts of fumaric acid semi-esters or fumaric acid diesters can be used with anthracene for this purpose and be subjected to trans-esterification.

On the other hand, the addition of the anthracene to the dienophilic groupings of the polyester can be carried out during or after the production of the unsaturated polyester, by anthracene in the required quantity being added to the condensation mixture from the outset or after splitting off the main quantity of the water of condensation, the addition being produced by heating to temperatures above 100° C. and advantageously 150–200° C. The proportion of anthracene in the polyester is to be such that the molar ratio between anthracene and fumaric acid is between 1:3 and 1:8.

Instead of anthracene, in principle it is also possible to employ substitution products of anthracene, for example 9,10-dichloranthracene, 2,3- or 2,4-dimethylanthracene, 9-ethylanthracene or mixtures of these compounds.

The combination of the said polyesters with fiber inserts or fillers can take place in various ways after adding organic peroxides as hardening catalysts. For example, the insert material or fillers can be combined in the molten state with the polyesters to be used according to the invention, the upper temperature limits to be maintained depending on the reactivity of the peroxide to be used and the lower temperature limits being given by the melting point of the ester to be employed. In most cases, tempertures between 80 and 110° C. will be used. It is also possible to use a solution of the resin in an organic solvent for treating the fibrous material by coating, dipping and the like at room temperatures or elevated temperatures, advantageously between approximately 20 and 60° C. The solutions to be used generally have a solid content of about 10–50%. As solvents, there are advantageously employed chlorinated hydrocarbons, such as methylene chloride, chloroform, carbon tetrachloride, 1,2-dichloroethene, trichloroethylene, etc.

Mineral and also organic natural or synthetic fibres are suitable as fibrous reinforcing materials and the following are to be mentioned by way of example: Asbestos, jute, sisal, polyamide, polyacrylonitrile and metal fibers, but especially glass fibers in the form of rovings, fabrics and mats. The resin content of these synthetic resin-bonded fiber-containing materials can be between 20 and 90%, calculated on the total quantity of fibers and resin. In addition, it is obviously also possible to process the aforementioned unsaturated polyesters in combination with conventional inorganic or organic fillers, such as chalk, ground shale, active silica, talcum, heavy spar, powdered cork, and colour pigments; the content of fillers can be 20–200%, based on the proportion of resin.

As curing agents in principle it is possible to use substances generally used as catalysts for polymerizing unsaturated polyester vinyl monomer mixtures. However, in order to obtain polyester resin mixtures having a long storage time, it is advantageous to use organic peroxides which initiate polymerization at temperatures above 100° C. Peroxides of this type are for example tert.-butyl hydroperoxide, di-tert.-butyl peroxide, tert.-butyl perbenzoate, cumene hydroperoxide, and dicumene peroxide, as well as 2,2-bis-(tert.-butylperoxy)-butane.

The final hardening or curing of the styrene-free polyester combination to be used according to the invention is effected by heating the composition containing modified polyester resin, fibrous reinforcing material and peroxide catalyst to temperatures of about 100–150° C. and applying pressures of 1–20 kg./cm.$^2$.

The structures or elements which can be produced by the process of the invention are distinguished by a non-tacky condition, which facilitates a clean and satisfactory cutting. Furthermore, they show an unexpectedly high improvement in the storability, which is within the range of 6 months and higher at room temperature. Even with the unreinforced resins, important improvements as regards the mechanical properties, more especially bending strength and impact toughness, are noted by comparison with known comparable resins, and there is especially noticeable reduction in their brittleness by comparison with unmodified resins. In addition, particularly with the reinforced resins, and especially with laminates, a corresponding and quite considerable improvement in the mechanical qualities is observed.

Often the polymer should contain up to 0.01% by weight (based upon the weight of polyester resin) of a polymerization initiator such as hydroquinone, copper resinate, cuprous chloride, etc.

Further details of the process will be apparent from the following examples, in which the parts indicated are parts by weight.

Example 1

630 parts of butylene-1,4-glycol, 696 parts of fumaric acid and 270 parts of anthracene are heated to 190° C. while passing over carbon dioxide. After the main quantity of the water of esterification has distilled off, the mixture is heated for 3 hours under a vacuum of about 30 mm. Hg. 0.15 part of hydroquinone is then added for stabilization purposes and the mixture is allowed to cool. A crystalline mass is formed which has a melting point of 90° C.

33 parts of this polyester are dissolved in 67 parts of 1,2-dichloroethane, and 0.66 part of tert.-butyl perbenzoate paste (50% in dimethyl phthalate) is added. Glass fiber mats are then impregnated with this solution and the solvent is allowed to evaporate in air. The storability of the initially impregnated material as thus obtained is about 6 months at room temperature.

The pressing with shaping is carried out in 3 minutes at a temperature of 130° C. and a pressure of 1.5–3 kg./cm.$^2$.

The mechanical strength properties are as follows:

|  | Laminate (45% glass fiber content) | Pure resin |
| --- | --- | --- |
| Bending strength (kg./cm.$^2$) | 2,650 | 670 |
| Bending angle (degrees) | 22 | 8 |
| Impact toughness (cmkg./cm.$^2$) | 57 | 2.3 |
| Brinell hardness (kg./cm.$^2$): |  |  |
| 10 sec | | 1,410 |
| 60 sec | | 1,280 |

The comparison values of the pure fumaric acid-butylene-1,4-glycol polyester are as follows:

|  | Laminate (45% glass fiber content) | Pure resin |
| --- | --- | --- |
| Bending strength (kg./cm.$^2$) | 1,185 | 380 |
| Bending angle (degrees) | 40 | 6 |
| Impact toughness (cmkg./cm.$^2$) | 26 | 1.2 |
| Brinell hardness (kg./cm.$^2$): |  |  |
| 10 sec | | 1,870 |
| 60 sec | | 1,760 |

Example 2

In accordance with the data given in Example 1, a polyester is prepared from 570 parts of butylene-1,4-glycol, 696 parts of fumaric acid and 270 parts of anthracene and stabilized with 0.15 part of hydroquinone. The melting point of the product is 86° C.

3 parts of dicumyl peroxide are added to 100 parts of the polyester in the molten state at about 80° C. and glass fiber fabrics are impregnated therewith at this temperature. The storability of the initially impregnated material thus obtained is about 6 months at room temperature.

The pressing with shaping is effected in 10 minutes at a temperature of 150° C. and a pressure of 1.5–3 kg./cm.$^2$.

The mechanical strength properties are as follows:

|  | Laminate (40% glass fiber content) | Pure resin |
| --- | --- | --- |
| Bending strength (kg./cm.$^2$) | 2,180 | 890 |
| Bending angle (degrees) | 43 | 11 |
| Impact toughness (cmkg./cm.$^2$) | 35 | 1.9 |
| Brinell hardness (kg./cm.$^2$): |  |  |
| 10 sec | | 1,520 |
| 60 sec | | 1,415 |

Example 3

In accordance with the data of Example 1, a polyester is prepared from 600 parts of butylene-1,4-glycol, 696 parts of fumaric acid and 180 parts of anthracene and stabilized with 0.15 part of hydroquinone. The melting point of the product is 99° C.

33 parts of the polyester are dissolved in 67 parts of 1,2-dichloroethane, and 0.66 part of tert.-butyl perbenzoate paste (50% in dimethyl phthalate) is added. This solution is used as an impregnation bath, through which endless glass fiber rovings are drawn, which rovings are conducted through a moderately heated oven (about 60° C.) and thereafter are conveyed through a cutting unit which produces cut sections with a length of 1–3 cm. The moulding composition thus obtained has a storability of about 6 months at room temperature.

The pressing with shaping is effected at a temperature of 130° C. and a pressure of 1.5–3 kg./cm.$^2$.

The mechanical strength properties are as follows:

|  | Laminate (40% glass fiber content) | Pure resin |
| --- | --- | --- |
| Bending strength (kg./cm.$^2$) | 1,310 | 560 |
| Bending angle (degrees) | 28 | 8 |
| Impact toughness (cmkg./cm.$^2$) | 22 | 1.7 |
| Brinell hardness (kg./cm.$^2$): |  |  |
| 10 sec | | 1,620 |
| 60 sec | | 1,510 |

What we claim is:

1. A composition of matter consisting essentially of (I) a polymerizable linear polyester resin consisting of the reaction product of (a) fumaric acid, (b) a dihydric saturated aliphatic alcohol containing an even number of —$CH_2$— groups, and (c) anthracene, the molar ratio of anthracene to fumaric acid in said resin being between 1:3 and 1:8, (II) a fibrous reinforcing material, and (III) an organic peroxide polymerization catalyst which initiates polymerization at temperatures above 100° C.

2. The composition of claim 1, wherein the dihydric saturated aliphatic alcohol of said resin is butylene-1,4-glycol.

3. The composition of claim 1, wherein said dihydric saturated aliphatic alcohol of said resin is selected from the group consisting of ethylene glycol, butylene-1,4-glycol, hexane-1,6-diol and 2,2′-dimethyl propane-1,3-diol.

4. The composition of claim 1, wherein the dihydric saturated aliphatic alcohol of said resin is butylene-1,4-glycol, said fibrous reinforcing material is glass fibers and said catalyst is dicumylperoxide.

5. A reinforced plastic article prepared by polymerizing the composition of claim 1 to an infusable, insoluble resinous composition at a temperature between 100° and 150° C. while applying a pressure of 1–20 kg./cm.$^2$.

References Cited by the Examiner

UNITED STATES PATENTS

| 2,475,731 | 7/1949 | Weith. | |
| 3,106,361 | 1/1962 | Schweiker et al. | 260—40 |
| 3,027,338 | 3/1962 | Chetakian | 260—40 |
| 3,032,431 | 5/1962 | Ferrigno | 260—40 XR |

FOREIGN PATENTS

| 1,148,746 | 5/1963 | Germany. |
| 1,150,523 | 6/1963 | Germany. |

OTHER REFERENCES

Chemical Abstracts 53, 8708f (1959), abstract of Japan Patent 9,589 (1957).

Chemical Abstracts 53, 16592f (1959), abstract of Japan Patent 5,848 (1958).

Ellis: "Chemistry of Synthetic Resins," vol. 1, 1935, Reinhold, page 242.

Fiesser et al.: "Organic Chemistry," third ed., 1956, Reinhold, page 760.

Akita et al.: Japanese patent application publication, 4 pages, translation in 260–75A; 12 pp., 335–848, July 1958.

MORRIS LIEBMAN, *Primary Examiner.*

MILTON STERMAN, *Examiner.*

A. H. KOECHKERT, *Assistant Examiner.*